United States Patent [19]
McEwen

[11] Patent Number: 5,961,828
[45] Date of Patent: Oct. 5, 1999

[54] COMPACT DRIVE SYSTEM UTILIZING GEAR BOX WITH WORM AND CYCLOIDAL GEARS

[75] Inventor: Stephen N. McEwen, Bowling Green, Ohio

[73] Assignee: Henry Filters, Inc., Bowling Green, Ohio

[21] Appl. No.: 08/942,929

[22] Filed: Oct. 2, 1997

[51] Int. Cl.[6] ................................................. B10D 21/20
[52] U.S. Cl. ......................... 210/526; 210/541; 475/167; 475/343
[58] Field of Search ................................. 210/526, 541; 475/167, 168, 343

[56] References Cited

U.S. PATENT DOCUMENTS

| | | | |
|---|---|---|---|
| 2,307,556 | 1/1943 | Wileman ................................. | 210/526 |
| 2,322,720 | 6/1943 | Scott et al. ............................. | 475/343 |
| 3,307,434 | 3/1967 | Kope ...................................... | 475/167 |
| 3,385,448 | 5/1968 | Honan et al. .......................... | 210/526 |
| 3,764,162 | 10/1973 | Rawlings ................................ | 475/343 |
| 4,426,064 | 1/1984 | Healy ..................................... | 254/342 |
| 4,640,154 | 2/1987 | Osborn .................................. | 475/167 |
| 4,715,964 | 12/1987 | Harms .................................... | 210/783 |
| 5,018,403 | 5/1991 | Umezono et al. ..................... | 74/425 |
| 5,080,638 | 1/1992 | Osborn .................................. | 475/179 |
| 5,135,373 | 8/1992 | Couzens ................................ | 418/190 |
| 5,194,155 | 3/1993 | Schwartz ............................... | 210/541 |
| 5,264,126 | 11/1993 | Shurtleff ................................. | 210/541 |
| 5,286,236 | 2/1994 | Hosokawa et al. .................... | 475/168 |
| 5,344,556 | 9/1994 | McEwen et al. ....................... | 210/91 |

FOREIGN PATENT DOCUMENTS 6235444  8/1994  Japan .

*Primary Examiner*—Christopher Upton
*Attorney, Agent, or Firm*—Howard & Howard

[57] ABSTRACT

The present invention includes a compact drive system comprising a housing, a motor, a worm screw, a first gear, an internal gear, a second gear and an output gear. The motor is supported relative to the housing and the worm screw is driven by the motor. The first gear rotates about a central axis and is driven by the worm screw to provide a first gear reduction. The first gear has a hub offset from the central axis. The internal gear mounts relative to the housing and has a predetermined number of internal teeth. The second gear has an aperture which is driven by the eccentric hub as the eccentric hub rotates. The internal teeth cooperate with the external teeth so that the second gear orbits within the internal gear when driven by the eccentric hub to provide a second gear reduction. An output gear rotates about the central axis and is supported relative to the housing. The output gear and the second gear have cooperating drive pins and elongated slots enabling the second gear to rotatable drive the output gear while facilitating limited eccentric movement therebetween. The drive system may be used to drive an endless chain and flight conveyor system on a machine tool coolant filtration tank.

7 Claims, 3 Drawing Sheets

COMPACT DRIVE SYSTEM UTILIZING GEAR BOX WITH WORM AND CYCLOIDAL GEARS

INCORPORATION BY REFERENCE

U.S. Pat. No. 4,715,964, entitled Method For Filtering Contaminated Liquids and issued on Dec. 29, 1987, is hereby incorporated by reference in its entirety.

1. Technical Field

This invention relates to drive systems employing gear boxes to provide a two-speed gear reduction.

2. Background Art

Drive systems for mechanical apparatus often utilize engines or motors in conjunction with gear boxes. The gear boxes include housings, shafts and gears in combinations which can be quite large and expansive. For example, gear boxes may include multiple gear sets to effect several stage gear reductions or increases in rotating output of shafts. The gears may rotate about a number of orthogonal axes. Motors coupled to the gear boxes further increase the overall size of the drive systems.

Conventional drive systems of gear boxes and motors may present space constraint problems in certain applications. One instance is drive systems for machine tool coolant filtration tanks. These filtration tanks employ conveyor systems to drag out particulates from the bottom of settlement compartments of the filtration tanks. The conveyor systems include a drive shaft and have spaced apart drive sprockets which serve to drive chains and flights of the conveyor system. The flights extend laterally across the width of the tank and carry debris from the tank when the drive shaft is rotated.

Located laterally outside the filtration tanks are drive systems. One common system includes an electric motor having a laterally extending shaft with a pulley thereon connecting with a second pulley coupled to a gear box which drives the chain and flight conveyor. The motor, shafts, pulleys, gearbox and a safety cover or housing mounted on the side of the settlement tank can be of substantial width.

Filtration tanks may be located below floor level in pits to accommodate liquid flow in collecting troughs which bring contaminated machine tool coolant from machine tools back to the filtration tanks. The pits must be wide enough to accommodate the settlement tanks and the drive systems mounted on the sides thereof. It is desirable to limit the size of the pits. The ability to do this is related to minimizing the width of the gear box and motor of the drive system.

Alternatively, a filtration tank may be located above ground and adjacent a wall. Again, to conserve space it is desirable to provide a gear box and motor on the side of the filtration tank which is as narrow in width as possible. This allows the filtration tank to be placed close to the wall.

Another concern is that drive systems can be complex and expensive. Often the gear boxes have a large number of gears, pulleys and shafts which are quite costly. Further, compact two speed gear reduction systems usually do not provide a high gear reduction ratio.

The present invention addresses these shortcomings of drive systems utilizing oversized gearboxes which are unnecessarily complex and expensive and which do not provide a high gear reduction ratio.

SUMMARY OF THE INVENTION

It is an object of the present invention to provide a gear box and motor combination which is more compact in width than those employed in conventional drive systems.

It is yet another object to provide a two speed gear box which may readily have a gear ratio of greater than a 1000:1 and preferably, greater than 3000:1.

Still yet another object is to use a worm gear set in combination with a cycloidal gear set to provide a two-stage gear reduction set in a compact gear box for use with conveyor systems for machine tool coolant filtration tanks.

In accordance with the present invention, a drive system is provided comprising a housing, a motor, a worm screw, a first gear, an internal gear, a second gear and an output gear. The motor is supported relative to the housing and the worm screw is driven by the motor. The first gear rotates about a central axis and is driven by the worm screw to provide a first gear reduction. The first gear has an eccentric hub offset from the central axis. The internal gear is preferably supported relative to the housing and has a predetermined number of internal teeth. The second gear has a central aperture which is orbitally driven by the eccentric hub as the eccentric hub rotates. The second gear preferably has a predetermined number of external teeth which is less than the predetermined number of internal teeth on the internal gear. The internal teeth cooperate with the external teeth so that the second gear orbits relative to the internal gear when driven by the eccentric hub to provide a second gear reduction. An output gear rotates about the central axis and is supported relative to the housing. The output gear and the second gear have cooperating drive pins and elongated slots enabling the second gear to rotatable drive the output gear while facilitating limited eccentric movement therebetween.

The invention further includes a filtration tank incorporating the above drive system. The filtration tank includes a settlement tank having laterally spaced apart walls, a floor and an inclined wall. Settled contaminants fall upon the floor. A conveyor system including a pair of laterally spaced apart endless chains and laterally extending flights transports the settled contaminants from the settlement tank. A pair of idler sprockets are located at one end of the settlement tank and a pair of drive sprockets are located at the other. The endless chains are mounted around respective pairs of idler and drive sprockets. A drive shaft has the drive sprockets mounted thereon. The drive system drives the drive shaft with drive sprockets moving the endless chains and flights to drag out contaminants from the floor and up the inclined wall to expel the contaminants from the filtration tank.

BRIEF DESCRIPTION OF THE DRAWINGS

These and other features, objects, and advantages of the present invention will become readily apparent from the following description, pending claims, and accompanying sheets of drawings where:

BEST MODE FOR CARRYING OUT THE INVENTION

Figure 1:
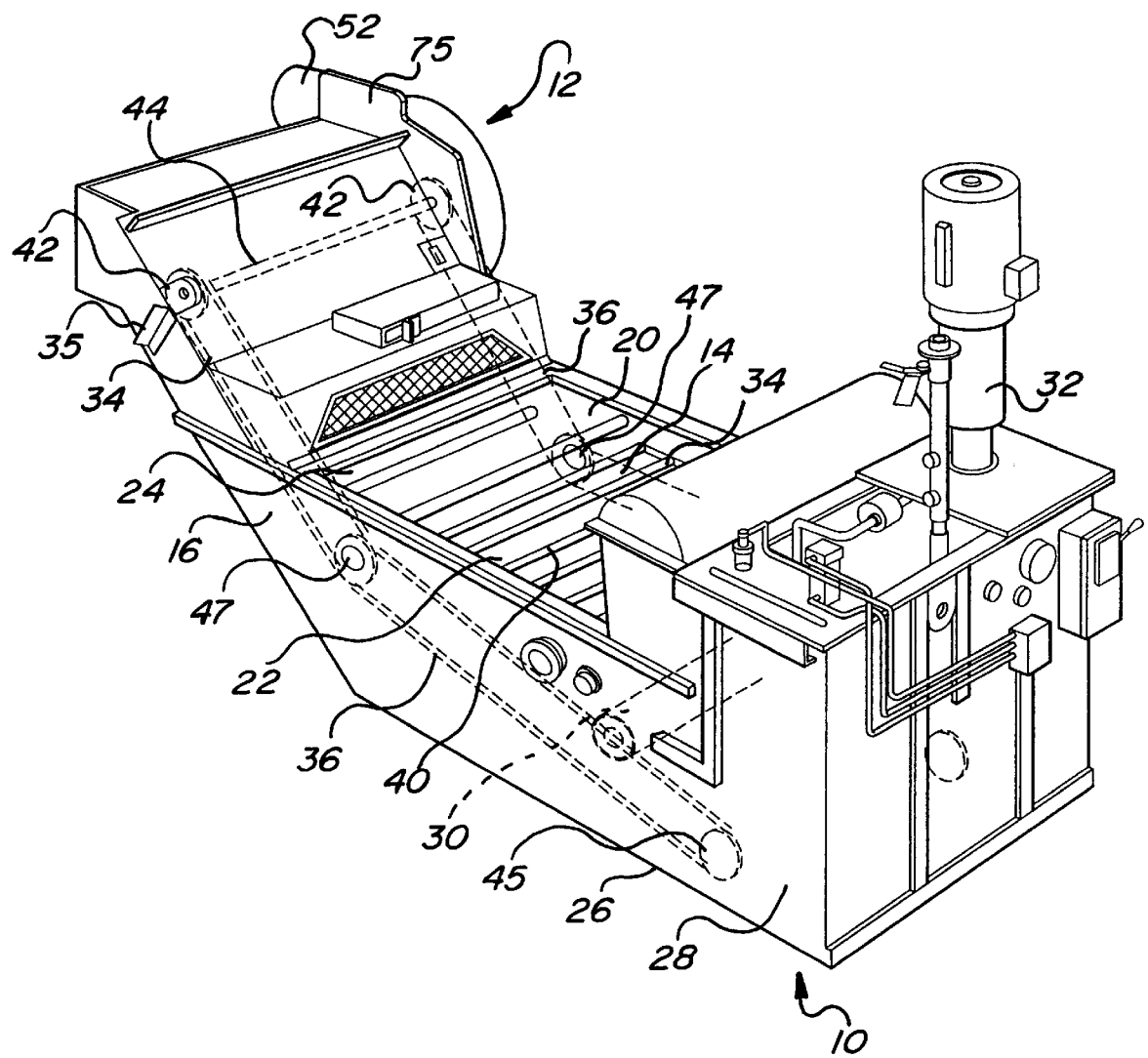
FIG. 1 is a perspective view of a machine tool coolant filtration tank utilizing a drive system having a gear box and motor made in accordance with the present invention.

A machine tool coolant filtration tank 10 is shown in FIG. 1 which employs a compact drive system 12 made in accordance with the present invention. Machine tool coolant is used to lubricate and cool machine tools (not shown) during machining. Also, the tool coolant serves to carry away machining debris and metal chips from the machine tools. Filtration tank 10 is used to remove these chips and debris from the tool coolant with the cleansed tool coolant being returned to the machine tool for further use.

The contaminated tool coolant is often transferred through trough systems (not shown) and is collected in filtration tank 10. Filtration tank 10 may be located in a pit below floor level to accommodate the draining of contaminated tool coolant from the machine tools into filtration tank 10. It is desirable to keep the size of filtration tank 10 and the underground pit as small as possible. Alternatively, if filtration tank 10 is located above ground, but next to a wall, it is also desirable to keep drive system 12 as narrow in lateral width as possible.

Tool coolant is collected in a settlement compartment 14 of filtration tank 10. Settlement compartment 14 includes a pair of laterally spaced apart side walls 16 and 20, a floor 22, an inclined rear wall 24 and a forward wall 26. Located ahead of forward wall 26 is a clean tool coolant compartment 28 for storing filtered tool coolant.

A portion of the contaminants which enter settlement tank 14 fall out of suspension and onto floor 22. The remaining contaminants are removed from the tool coolant using a filtration mechanism 30, such as a drum filter or else a series of disc filters. Tool coolant passes through screens on the filters with a filter cake of contaminants forming on the surface of the screens. Filtration mechanism 30 is rotated or indexed with a scraper (not shown) scraping the filter cake off the screens. The filter cake then falls atop floor 22.

A pump 32 is fluidly connected (not shown) to the filtration mechanism 30 to provide suction to effect the passage of tool coolant through the screens and to pump cleansed tool coolant back to clean tool coolant compartment 28 and then to the machine tools for reuse. U.S. Pat. No. 4,715,964, which has been incorporated by reference, discloses in fuller detail the filtration operation and components of filtration tank 10.

A conveyor system 34 is used to drag out particulates which have fallen on to floor 22, up inclined rear wall 24, and out a rear opening 35. Conveyor system 34 includes a pair of laterally spaced apart chains 36 and laterally extending flights 40 extending therebetween. Laterally spaced drive sprockets 42 are mounted on a shaft 44 disposed adjacent the top end of inclined wall 24. A pair of idler sprockets 45 are used at the forward end of settlement compartment 14 to rotatably support chains 36 at the forward end of settlement compartment 14. Similarly, intermediate idler sprockets 47 are used at the transition between floor 22 and inclined rear wall 24. When shaft 44 and drive sprockets 42 are rotated, flights 40 travel across floor 22 and up inclined rear wall 24 dragging contaminants out of settlement compartment 14 and dumping them from rear opening 35. Typically, though not shown, a waste bin catches the discarded contaminants so that the contaminants may be recycled.

Figure 2:
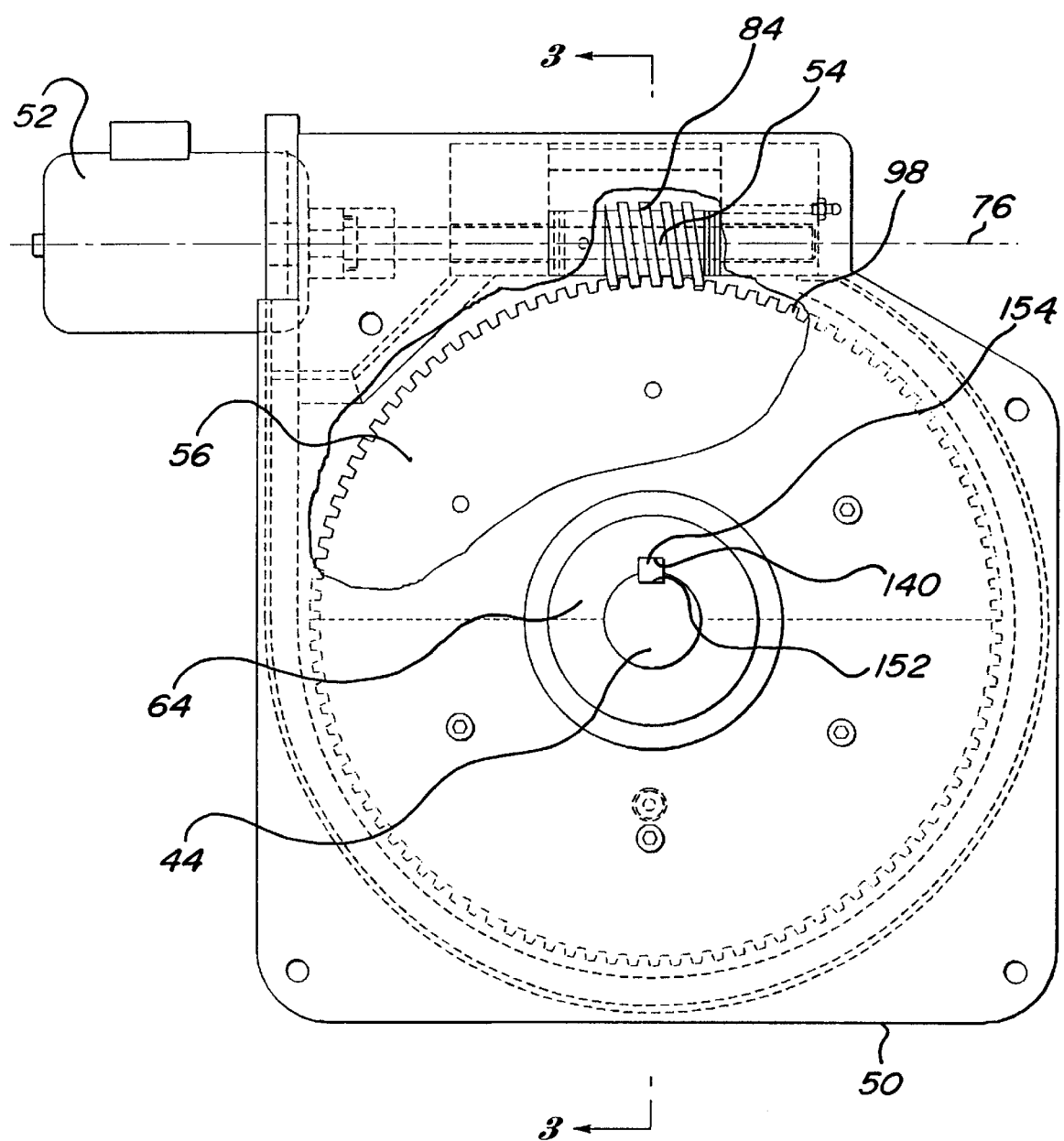
FIG. 2 is schematic side view, partially in cutaway, of the gear box of FIG. 1.

Drive system 12 is used to drive shaft 44. Major components of drive system 12 are shown schematically in FIGS. 2 and 3. These components include a gear box 50 and a motor 52. Gear box 50 comprises a housing 53, a worm screw 54, a first gear assembly 56, an internal gear assembly 60, a second gear assembly 62, and an output gear assembly 64. These components cooperate to form a compact two-speed gear reduction set with a 3000:1 gear speed reduction as will be described below. This gear speed reduction can be easily increased beyond this 3000:1 ratio if so desired.

Figure 3:
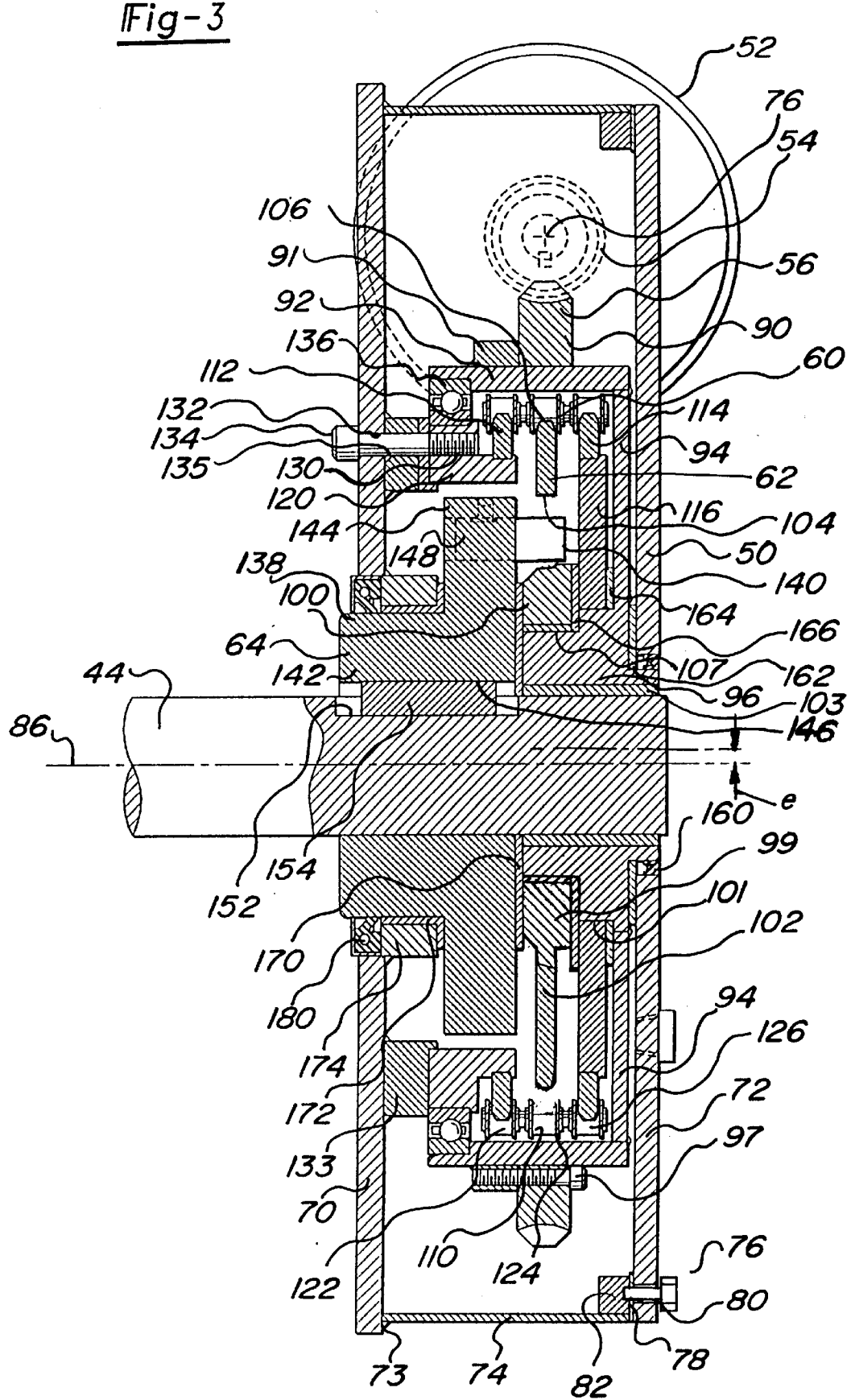
FIG. 3 is a schematic sectional view of the gear box and motor taken along line 3—3 of FIG. 2.

Referring to FIG. 3, housing 53 includes inboard and outboard side plates 70 and 72 and an intermediate peripheral wall 74 extending therebetween forming generally closed housing 53. Inboard side plate 70 is preferably secured to side wall 20 of settlement compartment 14. The total width of housing 53 is approximately six inches. Inboard plate 70 is welded to peripheral wall 74 using a weld 75. A plurality of fasteners 76 pass through apertures 80 in outboard plate 72 and are threadedly received in retaining blocks 82 to affix outboard plate 72 to peripheral wall 74. Blocks 82 are welded to peripheral wall 74. A gasket 78 is used between outboard plate 70 and peripheral wall 74 to prevent fluid leakage therebetween.

Motor 52, in this exemplary embodiment, is a ¾ horsepower electric motor which operates at 1725 revolutions per minute. A bracket 75 (FIG. 1), secured to settlement compartment 14, supports motor 52. Motor 52 is coupled to and drives worm screw 54 which rotates about a longitudinal axis 76. Worm screw 54, in this example, has a single thread worm with six threads or teeth 84 per inch and has a two inch pitch diameter. Worm screw 54 serves as an input gear. It is contemplated that other types of input gears could also be used to drive the periphery of first gear assembly 56.

Located beneath motor 52 and worm screw 54 is first gear assembly 56. First gear assembly 56 is driven by worm screw 54 and rotates about a central axis 86 which extends perpendicular to first longitudinal axis 76. Disposed radially within first gear assembly 56, which is generally C-shaped in cross-section, are internal gear assembly 60, second gear assembly 62, and output gear assembly 64 providing a compact packaging of drive system 12.

First gear assembly 56 comprises a worm gear 90, an auxiliary plate 91, a horizontally extending support plate 92, a radially extending web plate 94, and an eccentric hub 96. Worm gear 90 has six teeth 98 per inch with a pitch diameter of 16⅔ inch for a total of one hundred teeth 98. This first gear set of worm screw 54 and worm gear 90 thus have a gear reduction ratio of 100:1.

Auxiliary plate 91 is threadedly joined by six bolts 97 to worm gear 90 and is welded on the radially outer surface of support plate 92. Web plate 94 is also welded to support plate 92. Web plate 94 and support plate 92 combine to give first gear assembly 56 a generally C-shaped cross-section. Affixed to the radially inner surface of web plate 94 is eccentric hub 96. Eccentric hub 96 has a circular outer bearing surface 99 which has a 0.199 inch offset or eccentricity relative to central axis 86. Eccentric hub 96 also has a radially outer concentric surface 101 which serves to support internal gear assembly 60. A bearing collar 103 is disposed between eccentric hub 96 and shaft 44 allowing for relative rotation between eccentric hub 96 and shaft 44.

First gear assembly 56, and eccentric hub 96 in particular, drive second gear assembly 62. Second gear assembly 62 includes a bearing ring 100 and a second gear 102. Bearing ring 100 has an inner radial surface which is driven by eccentric hub 96. Second gear 102 is welded to bearing ring 100. Second gear 102 has four elongate radially extending slots 104 which are spaced 90 degrees apart. Also, fifty eight external teeth 106 are formed on the outer periphery of second gear 102. A wear ring 107 is disposed between bearing ring 100 and eccentric hub 96 to accommodate relative movement therebetween.

Surrounding second gear assembly 62 is internal gear assembly 60 which is affixed to and remains stationary with respect to housing 53 in this preferred embodiment. Internal gear assembly 60 includes a chain belt 110, a pair of inboard and outboard sprocket plates 112 and 114, a web plate 116, and a support plate 120.

Chain belt 110 is three links wide with an inboard belt 122, a central belt 124, and an outboard belt 126. Each of respective belts 122, 124, and 126 has sixty links. Inboard and outboard sprocket plates 112 and 114 each have sixty teeth which are received in the respective sixty links of inboard and outboard belts 122 and 126. Teeth 106 of second gear 102 are received within the links of central belt 124 to permit second gear 102 to roll within chain belt 110. As there are only fifty eight teeth on second gear 102, second gear assembly 62 may "orbit" within the sixty links of central belt 124. The pitch diameter of second gear 102 is smaller than the pitch diameter of chain belt 124.

Outboard sprocket plate 114 is affixed on its inner radial periphery to web plate 116. Web plate 116 slidingly bears upon concentric surface 101 of eccentric hub 96. Inboard sprocket 112 is radially supported by and welded to support ring 120. Support ring 120 has six circumaxially spaced threaded apertures 130. Inboard side plate 70 of housing 52 has six corresponding apertures 132. An annular ring 133 is disposed between support ring 120 and inboard side plate 70 and has six apertures 135. Respective threaded fasteners 134 extend through apertures 132 and 135 and are threadedly received in apertures 130 to suspend support ring 120 from housing 53. Accordingly, chain belt 110 is held stationary with respect to housing 53.

Disposed between intermediate support ring 120 and support plate 92 of first gear assembly 56 are ball bearings 136. Consequently, first gear assembly 56 can rotate about stationary internal gear assembly 60.

Each time eccentric hub 96 makes one revolution within bearing ring 100, second gear 102 will advance a distance of 2 links on chain belt 110 or 2/60 or 1/30 of a revolution. Accordingly, the gear reduction ratio between eccentric hub 96 of first gear assembly 56 and second gear assembly 62, which is disposed within stationary internal gear assembly 60, is 30:1.

Output gear assembly 64 includes an annular L-shaped output gear 138 and four circumaxially spaced apart drive pins 140, one of which is seen in FIG. 3. Output gear 138 has an axial portion 142 and a flange portion 144. Located on the inner radial surface of axial portion 142 is a keyway 146. Four apertures 148 are formed in flange portion 144 into which respective drive pins 140 are held in an interference fit. Shaft 44 has a keyway 152 machined therein. A key 154 is located in keyways 146 and 152 to fasten shaft 44 to output gear 138. Drive pins 140 extend through respective elongate slots 104 in second gear 102. Elongate slots 104 are sufficiently long to accommodate the orbital movement of second gear 102 about drive pins 140 of output gear assembly 64 as output gear assembly 64 concentrically rotates about axis 86. Alternatively, it is possible to put slots in output gear 138 and drive pins in second gear 102.

A number of seals and bearing members are located between the above components. A grease seal 160 seals between outboard side plate 72 and an outer radial surface on eccentric hub 96. A bearing ring 162 fits between radially extending surfaces on eccentric hub 96 and outboard side plate 72. Similarly, a bearing ring 164 extends between stationary web plate 116 and web plate 94 of first gear assembly 56. Further, a bearing ring 166 is captured axially between web plate 116 and bearing ring 100. Typically, the bearing rings are made of Teflon or a soft metallic material, such as bronze.

On the opposite side of bearing ring 100 is a bearing ring 170 which interfaces with output gear 138. An L-shaped bearing plate 172 mates against output gear 138 and a support ring 174 which is welded to the inner radial perimeter of inboard side plate 70. A seal 180 seals radially between output gear 138 and inboard side plate 70 and against support ring 174.

In operation, motor 52 operates at 1725 revolutions per minute driving worm screw 54 at a like speed. Worm screw 54 drives first gear 90 of first gear assembly 56 with a gear reduction of 100:1. Consequently, first gear assembly 56 and eccentric hub 96 rotate at 17.25 revolution per minute. Eccentric hub 96 bears upon and rotates within concentric wear ring 107 and bearing ring 100. Consequently, second gear 102 of second gear assembly 62 walks around the inside of stationary chain belt 110 with a secondary gear reduction of 30:1. Therefore, second gear assembly 62 turns at 1/30 of the revolving speed of eccentric hub 96 or 0.5833 revolutions per minute.

The rotary movement of second gear 102 is transferred to output gear 138 and shaft 44 through drive pins 140. Second gear 102 eccentrically rolls or orbits about the inside of chain belt 110 and not concentrically about central axis 86. Elongated slots 104 allow drive pins 140 on output gear 138 and shaft 44 to turn concentrically about central axis 86 with elongated slots 104 moving radially inwardly and outwardly with respect to drive pins 140.

Output gear 138 drives shaft 44 of conveyor system 34. Consequently, conveyor system 34 transports sediment out of tool coolant filtration tank 10.

While in the foregoing specification this invention has been described in relation to a certain preferred embodiment thereof, and many details have been set forth for the purpose of illustration, it will be apparent to those skilled in the art that the invention is susceptible to alteration and that certain other details described herein can vary considerably without departing from the basic principles of the invention.

For example, each of first gear assembly 56, internal gear assembly 60, second gear assembly 62 and output gear assembly 64 could be made integrally to reduce the number of components as compared to the components described above. Also, it is possible to construct this invention with different cycloidal movement between the gear assemblies as long as the cycloidal gear reduction is accomplished. Further, it is possible to use a drive other than the worm screw to drive the periphery of the first gear assembly, although use of the worm screw is preferred. The worm screw allows the above described gear system to be very narrow. As shown in FIG. 3, housing 53 may be narrower than motor 52.

What is claimed is:

1. A two-speed gear reduction drive system for driving a output shaft to rotate about a central axis, the drive system comprising:

a housing;

a motor supported relative to the housing;

a worm screw driven by the motor to rotate about a longitudinal axis perpendicular to the central axis;

a worm gear having a generally circular outer periphery and an eccentric hub rotatable about the central axis, the worm gear periphery driven by the worm screw to rotate the eccentric hub about the central axis for providing a first gear reduction, wherein the eccentric hub has an eccentricity relative to the central axis;

an internal gear disposed radially within the worm gear, the internal gear provided with an endless chain belt having three rows of links, the internal gear further provided with inboard and outboard sprocket plates being affixed to the housing, each of the sprocket plates having an outer periphery provided with a given number of internal teeth, wherein each of the internal teeth of the sprocket plates is received in a respective link of the outboard rows of links;

a second gear disposed radially within the internal gear and rotatable about the central axis, the second gear having a generally circular outer periphery, an inner radial surface, and a plurality of elongated slots, the inner radial surface driven by the eccentric hub to rotate the second gear about the central axis for providing a second gear reduction, the second gear periphery provided with a given number of external teeth which is less than the given number of internal teeth of the sprocket plates, wherein each of the external teeth is received in a link of the middle row of links such that the second gear orbits within the internal gear when driven by the eccentric hub; and an output gear disposed radially within the internal gear and rotatable about the central axis, the output gear having a plurality of drive pins each extending through a respective elongated slot of the second gear thereby causing the output gear to rotate about the central axis as the second gear rotates, wherein the drive pins turn concentrically about the central axis and move radially inwardly and outwardly with respect to the elongated slots as the output gear rotates, wherein the output gear is coupled to the output shaft to drive the output shaft about the central axis as the output gear rotates.

2. The drive system of claim 1 wherein:

the first gear includes a generally horizontally extending annular wall disposed radially outside the internal gear and a radially extending wall thereby defining a generally C-shaped cross-section to the first gear.

3. The drive system of claim 2 wherein:

the internal gear and the second gear are disposed radially within the horizontally extending wall.

4. The drive system of claim 1 wherein:

the width of the drive system is less than twelve inches.

5. The drive system of claim 4 wherein:

the width of the drive system is less than six inches.

6. The drive system of claim 1 wherein:

the width of the housing is less than the width of the motor.

7. A filtration tank apparatus for removing contaminants from a fluid and conveying settled contaminants therefrom, the filtration tank apparatus comprising:

a settlement tank including a floor, a pair of side walls, and an inclined wall;

a conveyor system including a pair of laterally spaced apart endless chains and a plurality of flights extending laterally between the endless chains, the conveyor system traversing the floor and the inclined wall to carry contaminants from the settlement tank; and a two-speed gear reduction drive system for driving an output shaft to rotate about a central axis to drive the conveyor system, the drive system comprising:

a housing a motor supported relative to the housing;

a worm screw driven by the motor to rotate about a longitudinal axis perpendicular to the central axis;

a worm gear having a generally circular outer periphery and an eccentric hub rotatable about the central axis, the worm gear periphery driven by the worm screw to rotate the eccentric hub about the central axis for providing a first gear reduction, wherein the eccentric hub has an eccentricity relative to the central axis;

an internal gear disposed radially within the worm gear, the internal gear provided with an endless chain belt having three rows of links, the internal gear further provide with inboard and outboard sprocket plates being affixed to the housing, each of the sprocket plates having an outer periphery provided with a given number of internal teeth, wherein each of the internal teeth of the sprocket plates is received in a respective link of the outboard rows of links;

a second gear disposed radially within the internal gear and rotatable about the central axis, the second gear having a generally circular outer periphery, an inner radial surface, and a plurality of elongated slots, the inner radial surface driven by the eccentric hub to rotate the second gear about the central axis for providing a second gear reduction, the second gear periphery provided with a given number of external teeth which is less than the given number of internal teeth of the sprocket plates, wherein each of the external teeth is received in a link of the middle row of links such that the second gear orbits within the internal gear when driven by the eccentric hub; and an output gear disposed radially within the internal gear and rotatable about the central axis, the output gear having a plurality of drive pins each extending through a respective elongated slot of the second gear thereby causing the output gear to rotate about the central axis as the second gear rotates, wherein the drive pins turn concentrically about the central axis and move radially inwardly and outwardly with respect to the elongated slots as the output gear rotates, wherein the output gear is coupled to the output shaft to drive the output shaft about the central axis to drive the conveyor system as the output gear rotates.

* * * * *